(12) United States Patent
Stoyanov et al.

(10) Patent No.: US 9,641,415 B2
(45) Date of Patent: May 2, 2017

(54) METHOD AND SYSTEM FOR SEAMLESS SCTP FAILOVER BETWEEN SCTP SERVERS RUNNING ON DIFFERENT MACHINES

(71) Applicants: Latchesar Stoyanov, Sunnyvale, CA (US); Nishi Kant, Fremont, CA (US)

(72) Inventors: Latchesar Stoyanov, Sunnyvale, CA (US); Nishi Kant, Fremont, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 108 days.

(21) Appl. No.: 14/636,165

(22) Filed: Mar. 2, 2015

(65) Prior Publication Data

US 2015/0256436 A1 Sep. 10, 2015

Related U.S. Application Data

(60) Provisional application No. 61/947,426, filed on Mar. 4, 2014.

(51) Int. Cl.
*H04L 1/00* (2006.01)
*H04L 12/26* (2006.01)
(Continued)

(52) U.S. Cl.
CPC .......... *H04L 43/10* (2013.01); *H04L 41/0668* (2013.01); *H04L 43/0817* (2013.01);
(Continued)

(58) Field of Classification Search
CPC ............. H04L 41/0654; H04L 41/0659; H04L 41/0663; H04L 41/0668; H04L 41/0672;
(Continued)

(56) References Cited

U.S. PATENT DOCUMENTS 7,222,268 B2 * 5/2007 Zaifman ............. G06F 11/0793
714/4.12

* cited by examiner

*Primary Examiner* — Dady Chery
(74) *Attorney, Agent, or Firm* — Blank Rome, LLP

(57) ABSTRACT

A Stream Control Transmission Protocol (SCTP) cluster of multiple SCTP-servers is defined in such manner that some of the servers are assigned Active Role where others are assigned Standby Role with the purpose of ensuring uninterrupted SCTP-connections between the SCTP-cluster and any number of SCTP-clients. The Standby Servers use the same Internet Protocol (IP)-address(es) on the SCTP bound interfaces as their assigned Active Server. The Active Servers are effectively communicating to the SCTP-clients, where the Standby Servers are communicating to their assigned Active SCTP-Server using a separate backchannel TCP-connection. Over that backchannel connection the Standby Server receives regular updates from the Active Server. These updates hold enough information so that the Standby Server could locally simulate SCTP-negotiations and create SCTP-associations as if the SCTP-negotiations were performed directly with the SCTP-Clients. In this manner the Standby Servers are fully synchronized and ready in case of an Active Server failure to continue the SCTP-communications without any interruption. This handover does not involve any subsequent action from the SCTP-clients so that the SCTP-clients are unaware that such a handover took place.

18 Claims, 8 Drawing Sheets

(51) Int. Cl.
  *H04L 12/24* (2006.01)
  *H04L 29/06* (2006.01)
  H04L 12/931 (2013.01)
  H04L 29/12 (2006.01)

(52) U.S. Cl.
  CPC .......... *H04L 65/4069* (2013.01); *H04L 49/70* (2013.01); *H04L 61/103* (2013.01)

(58) Field of Classification Search
  CPC ......... H04L 45/22; H04L 45/28; H04B 10/03; H04B 10/032; H04B 10/035; H04B 10/038; H04J 14/0287; H04J 14/0289; H04J 14/029; H04J 14/0291; H04J 14/0293
  USPC ................................ 370/216, 217, 218, 225
  See application file for complete search history.

SCTP Cluster Data Flow at SCTP Association Release

METHOD AND SYSTEM FOR SEAMLESS SCTP FAILOVER BETWEEN SCTP SERVERS RUNNING ON DIFFERENT MACHINES

RELATED PATENT APPLICATIONS

The present invention claims priority from U.S. Provisional Patent Application Ser. No. 61/947,426, filed Mar. 3, 2014, the disclosure of which is herein specifically incorporated by reference in its entirety.

FIELD OF THE INVENTION

The present invention relates generally to mobile packet core networks. More particularly, this invention relates to a method and system for seamlessly moving established Stream Control Transmission (SCTP) associations between multiple SCTP-servers without any disruption of service.

BACKGROUND

As mobile broadband data network continues its migration to all-Internet Protocol (IP), the Internet Engineering Task Force (IETF) protocols are replacing legacy Signaling System No. 7 (SS7) based protocols. Specifically, SCTP (Stream Control Transmission Protocol) has become the de facto transport layer for all control plane signaling. SCTP was designed to have features missing from other two common IP transport protocols such as Transmission Control Protocol (TCP) and User Datagram Protocol (UDP). For example, SCTP supports multi-homing where it can bind to more than one IP address across different subnets. The multi-homing feature allows path resilience to the SCTP peers. It also helps with network interface failure on the peer machine.

In order to use SCTP for SS7 applications, various user adaptation layers were introduced such as SS7 Signaling Connection Control Protocol (SCCP)-User Adaptation Layer (SUA), Message Transfer Part (MTP) Level 3 User Adaptation Layer (M3UA), MTP Level 2 User Adaptation (M2UA), Integrated Services Digital Network (ISDN) User Adaptation (IUA), etc. which allow the use of a subset of SS7 protocol layers. These adaption layers have their own overhead but were necessary for the legacy applications that required SS7 as underlying serving protocol. As newer telecom protocols and applications take direct advantage of IETF based protocols and as such they use SCTP directly. The SS7 family of protocol was known for its high availability. The availability achieved what tied to error propagation method across the layers of protocol stack from Layer 1 to Layer 7. Such error propagation methods are not feasible in IP based protocol stack since many of the layers were designed independently and independent of applications.

The majority of early TCP/IP based communication did not involve large number of users connecting through a single association between nodes. For example even a single browser on a user computer may open several TCP connections with server(s) of the web objects. In telecommunication networks, it is rather common the association between two nodes carries communication for several thousand users. For example the SCTP based S1 interface between or Evolved Universal Terrestrial Across Network Node B (eNodeB) or Evolved Node B (eNB) base station and Mobility Management Entity (MME) carries signaling for all users connecting through that eNB. If the SCTP link were to fail, all users under that eNB will be unable to get cellular service.

Another consideration that is applicable to protocols in large networks is the scale of usage, i.e., how can be events or traffic be scaled up by utilizing more processing nodes that are connected by high capacity links. Thus load balancing and high availability consideration both put requirement on the underlying protocol implementation.

The SCTP is designed to be a host based protocol meaning there is only one SCTP association between two IP nodes. This is different than TCP where multiple TCP connections can exist between applications on two hosts. This aspect of SCTP has implication on both resilience as well as scalability. In a Long Term Evolution (LTE) network the MME keeps the mobility context for each attached user.

SUMMARY

Aspects of the disclosure include a first network element for facilitating communication of packets comprising: a network interface unit configured to interact with a packet network system; a processor with a memory associated with the network interface unit and adapted to: send to and receive from a group of other network elements connected to the first network element a plurality of backchannel heartbeat signals; detect interruption of at least one of the plurality of backchannel heartbeat signals from at least one or more interrupted network elements from the group of other network elements; and assume at least some of the packet communication responsibilities of the interrupted network elements from the group of other network elements.

Further aspects of the disclosure include a first Mobility Management Entity (MME) server for facilitating communication of packets using a Stream Control Transmission Protocol (SCTP) comprising: a network interface unit configured to interact with a packet network system; a processor with a memory associated with the network interface unit and adapted to: send to and receive from a second MME server connected to the first MME server a plurality of backchannel heartbeat signals; detect interruption of at least one of the plurality of backchannel heartbeat signals from the interrupted second MME server; broadcast a plurality of gratuitous Address Resolution Protocols (ARPs) with IP addresses of the interrupted second MME server on SCTP bound interfaces; assume at least some of the packet communication responsibilities of the second MME server.

Further aspects of the disclosure include a method for facilitating communication of packets at a first network element comprising: send to and receive from a group of other network elements connected to the first network element a plurality of backchannel heartbeat signals; detect interruption of at least one of the plurality of backchannel heartbeat signals from at least one or more interrupted network elements from the group of other network elements; and assume at least some of the packet communication responsibilities of the interrupted network elements from the group of other network elements.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
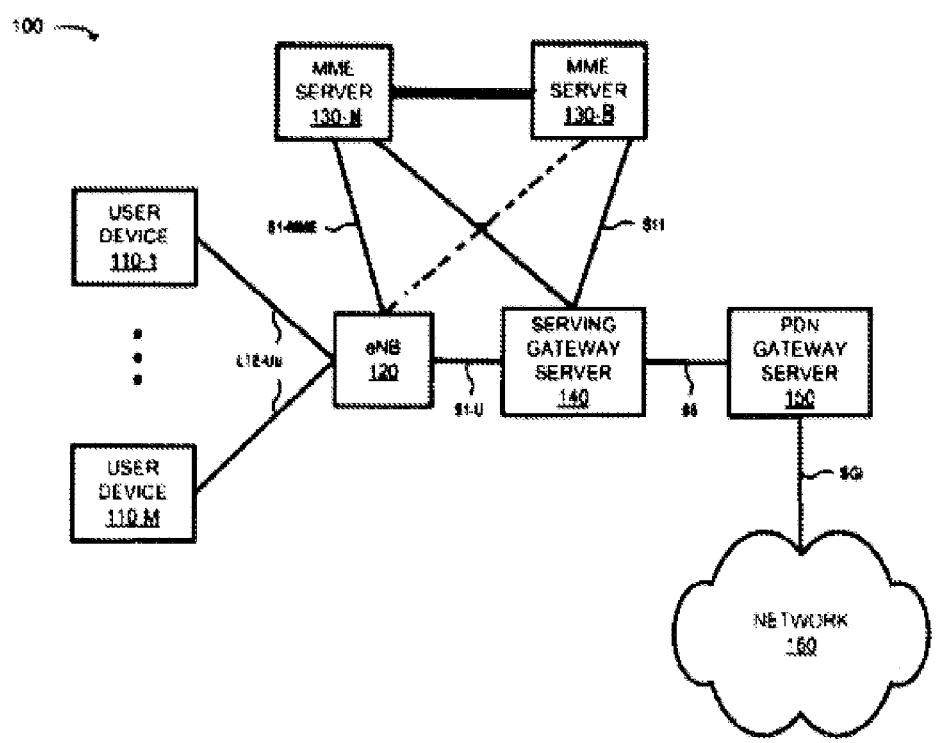
FIG. 1A is a schematic drawing illustrating a core network implementation in which systems and/or methods described herein of Active Server backed up by a Standby Server may be employed.

FIG. 1 is a diagram of an example environment 100 in which systems and/or methods described herein may be implemented. As shown, environment 100 may include a group of user devices 110-1, . . . , 110-M (where M≥1) (hereinafter referred to collectively as "UDs 110" and individually as "UD 110"), a group of eNodeB's 120 (hereinafter referred to as "eNB 120"), a cluster of MME servers including a group of MME servers 130-1, . . . , 130-N (where N≥1) and a backup MME server 130-B (hereinafter referred to collectively as "MME 130" and individually as "MME 130"), a serving gateway server 140 (hereinafter referred to as "SOW 140"), a packet data network (PDN) gateway server 150 (hereinafter referred to as "PGW 150") and a network 160. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Also, in some instances, one or more of the components of environment 100 may perform one or more functions described as being performed by another one or more of the components of environment 100.

As further shown in FIG. 1, components of environment 100 may interconnect via a variety of interfaces. For example, UD 110 may interconnect with eNB group 120 via an LTE-Uu interface. eNB group 120 may interconnect with MME 130 via an S1-MME interface and may interconnect with SGW 140 via an S1-U interface. SGW 140 may interconnect with MME 130 via an S11 interface and may interconnect with PGW 150 via an S5 interface. PGW 150 may interconnect with network 160 via a SGi interface. eNB 120 may include one or more devices that receive traffic being transported via environment 100, such as voice, video, text, and/or other data, to UD 110 via an air interface. eNB 120 may also include one or more devices that receive traffic, from UD 110, via the air interface and/or that transmit the traffic to devices within environment 100, such as MME 130, SGW 140, and/or another device. eNB 120 may control and manage radio network base stations (e.g., that transmit traffic over an air interface to and/or from UDs 110.

MMEs 130 may include one or more computation and/or communication devices that control and manage eNB 120. MMEs 130 may perform one or more of the following functions: Non-access stratum (NAS) signaling; NAS signaling security; security control; inter-core network signaling for mobility between 3GPP access networks; idle mode UD 110 reachability; tracking area list management (for UDs 110 in idle and active modes); handovers to and/or from environment 100; roaming; traffic policing functions; authentication operations; bearer management functions; etc. Ideally, a High Availability Engine (HAE) (also called failover application or failover engine) described in detail in this disclosure shall typically reside in each of the MMEs 130 shown in FIGS. 1A and 1B. However, in alternative embodiments the HAE may reside at a remote location in the cloud. As discussed below one of the MMEs 130 may be a Standby Server connected to just one or a group of Active MMEs 130.

SGW 140 may include one or more server devices, or other types of computation or communication devices, that gather, process, search, store, and/or provide information in a manner similar to that described herein. SGW 140 may establish a communication session with UD 110 based on a request received from MME 130. SGW 140 may, in response to the request, communicate with PGW 150 to obtain an IP address associated with UD 110.

PGW 150 may include one or more server devices, or other types of computation or communication devices, that gather, process, search, store, and/or provide information in a manner similar to that described herein. For example, in one implementation, PGW 150 may include a server device that enables and/or facilitates communications, using IP-based communication protocols, with other networks (e.g., network 160). PGW 150 may allocate IP addresses to UDs 110 that enable UDs 110 to communicate with network 160 based on a request from MME 130 via SGW 140.

Network 160 may include one or more wired and/or wireless networks. For example, network 160 may include a cellular network, a public land mobile network (PLMN), a 2G network, a 3G network, a 4G network, a fifth generation (5G) network, and/or another network.

In an SCTP implementation, if the SCTP supports multi-homing, a single SCTP association across two nodes can utilize multiple IP address and multiple network interfaces. This provides resilience in case of network interface failure or in case of one of the paths failure. The path switch upon link failure is very slow and can take up to a minute. In such a case a large number of eNBs 110 and hence thousands of users could be affected.

The SCTP is vulnerable to node failure. The SCTP is typically implemented in the kernel of the operating system of the node (e.g., MMEs 130). Therefore if the node were to fail, for example, due to card failure or operating system (OS) crash, the entire set up sequence has to be repeated to bring up the SCTP association. The problem becomes much more acute when an MME has SCTP associations with thousands of eNBs. In this case, MME failure will be followed by massive SCTP connection attempts toward the MME. Even a single SCTP connection failure can cause significant disruption for thousands of users.

Disclosed herein is a system and method for seamlessly moving SCTP-associations between Active SCTP-server(s) (i.e., MME 130-N) in failure and Standby SCTP-server (i.e., MMEs 130-B) which share exactly the same set of SCTP bound IP-addresses. FIG. 1A shows a single Active Server 130-N but may vary in number from 1 to N which are then backed up by Standby server 130-B. The SCTP bound interfaces of a Standby Server 130-B are rendered stealthy by suppressing the Address Resolution Protocol (ARP) communication. The ARP assists the Internet Protocol (IP) in directing datagrams to the appropriate receiving system by mapping Ethernet Media Access Control (MAC) addresses to known IP addresses. Thus when the Standby Server 130-B is in standby mode there are no SCTP packets coming to it.

The Active Server(s) 130-N and Standby Server 130-B maintain separate backchannel TCP-connections with each other which they use to exchange Change Of State (COS) Events. During idle times, the Standby Server 130-B sends backchannel Heartbeat (BHB) requests to the Active Server(s) 130-N at reasonable and adjustable predetermined intervals. SCTP communications involve continuously updating sequence numbers which control what packet segments need to be retransmitted when packets are lost. The requests for these sequence numbers from the Active Server(s) 130-N are embedded inside of the Heartbeat signals (or messages).

The Standby SCTP-server 130-B should ideally be synchronized and operation ready at all times. The Standby Server 130-B is able to continue SCTP-operations substantially instantaneously (e.g., less than a second) in case of an Active SCTP-server failure from the group MME 130-N. The SCTP hot-swap procedure of this disclosure does not involve the SCTP-clients so they are completely unaware that such hot-swap took place. An HAE is a linked list of SCTP records. At the systems implementing SCTP resilience (e.g., the SCTP cluster made up of MMEs 130), the HAE(s) described herein maintains an HAE playlist of the main SCTP COS Events for all active SCTP-clients—namely SCTP Association Up (i.e., connection is started and established). The Active SCTP-server(s) 130-N will record and insert new COS Events on the HAE playlist as well as propagate the COS Events to the Standby SCTP Server 130-B.

Depending on the operating system of the MME 130-B as well as on the SCTP-stack implementation, part of the HAE may reside in a kernel space of each of the MME servers 130 because the SCTP-stack is implemented on most operating systems as a kernel driver.

Figure 2A:
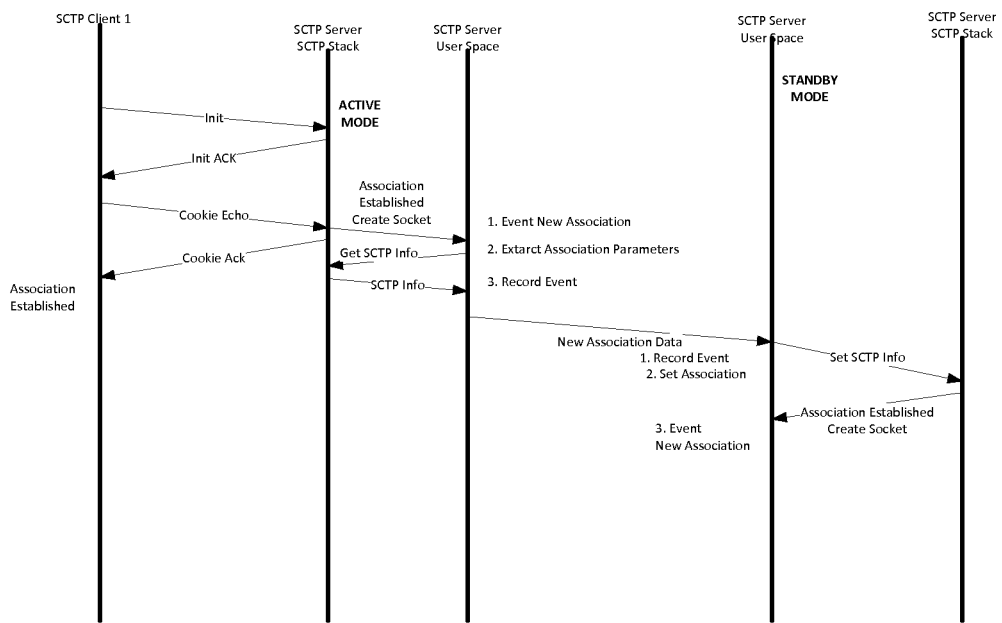
FIG. 2A is a data flow diagram illustrating a SCTP-negotiation between a SCTP-client and an Active SCTP-Server. It follows the procedure of creating a new SCTP-association and advertising this association to the Standby Server which results in creation of new association on the Standby Server.

FIG. 2A is a data flow diagram illustrating a SCTP-negotiation between SCTP-Clients 1 and an Active SCTP-Server(s) 130-N. It follows the procedure of creating a new SCTP-association and advertising this association to the Standby Server 130-B which results in creation of new association on the Standby Server 130-B. When the Active SCTP-servers 130-N establishes a new association, the HAE will request a SCTP-cookie from the SCTP-stack using the SCTP_GET_ASSOC. The SCTP-cookie is then stored in an SCTP Association Record together with the association number. An SCTP Association Record is a software structure which contains a SCTP association context consisting of minimum information necessary in order to reconstitute an SCTP association. This record is then added to the active SCTP-clients HAE playlist in MME 130-N. The new record is sent over to the Standby Server 130-B via the backchannel Heartbeat TCP-connection. HAE Playback is defined as the transfer of an entire HAE playlist from an Active HAE to a backup HAE. (It is possible that in that moment there is not any Standby Server. In this case when a new Standby Server is introduced it will set the BHB connection to the Active Server(s) 130-N. Once the connection is established the Active Server(s) 130-N will transfer the entire SCTP-Clients HAE playlist to the Standby Server 130-B).

After receiving the Association Record from the Active Server(s) 130-N, the Standby Server 130-B will add it to its local HAE playlist. Then it will replay this record to the HAE in the Standby Server 130-B. The HAE will extract the SCTP-client information from the SCTP cookie and create a new association for that client. The SCTP-HAE will insert the new association in the list of associations at the SCTP-Stack and set the state of this association to active. The SCTP-stack will then create a standard network socket and unblock the SCTP-server application which is waiting for new connections. This procedure effectively creates a new SCTP-association on the Standby Server 130-B. The SCTP Heartbeat timer for the new SCTP association is disabled in order to prevent the MME-130-B from sending SCTP Heartbeats out. New socket options are created in order to provide communication between the HAE and the SCTP stack. These socket options facilitate the information flow between these entities so that the HAE could request all aspects of the existing SCTP-associations as well as access the SCTP-stack state machine and simulates SCTP-negotiations. The HAE communicates to the SCTP-stack using custom socket options SCTP_GET_ASSOC and SCTP_SET_ASSOC.

Figure 2B:
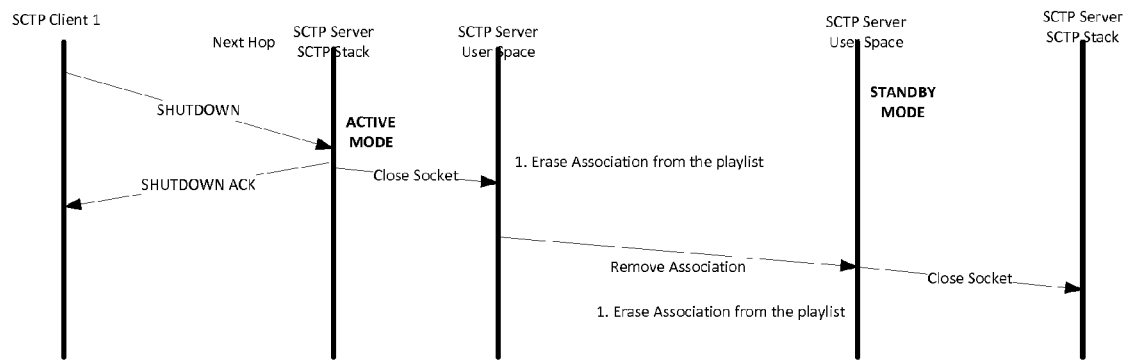
FIG. 2B is a data flow diagram illustrating a SCTP-Client initiated release of a SCTP-association as well as the procedure of updating the Standby Server and subsequently releasing the targeted SCTP-association on the Standby.

FIG. 2B is a data flow diagram illustrating a SCTP-Client initiated release of a SCTP-association as well as the procedure of updating the Standby Server 130-B and subsequently releasing the targeted SCTP-association on the Standby Server 130-B. During the life of an SCTP-association, the Active Server(s) 130-N will update the sequence numbers for that Association Record in its HAE playlist. The Standby Server 130-B will request updated sequence numbers for the SCTP-associations in its local HAE playlist from the Active Server(s) 130-N via the Heartbeat message. On receiving the sequence numbers it will forward them to the SCTP-HAE which will update the active associations. If a SCTP-Shutdown is initiated by a SCTP-client or if any other timeout event requests releasing an existing SCTP-association, the Active Server(s) 130-N will remove the Association Record from its HAE playlist. The Active Server(s) 130-N will forward a Release Event for the according association identification (i.e., association ID) to the Standby Server 130-B. The Standby Server HAE will set release request and will remove the targeted association from the SCTP-stack association list. The SCTP-stack will inform the SCTP-server application which will close the assigned to that association socket. This procedure effectively releases a SCTP-association on the Standby Server 130-B. Then the Standby Server HAE will remove the targeted SCTP-record from its local HAE-playlist.

When a server in the SCTP-cluster is assigned an active role (e.g., MME 130-N), the HAE in MME 130-N will issue gratuitous ARP's on all SCTP bound interfaces. The HAE will start an ARP timer which will on adjustable regular timed intervals (e.g., in the range of approximately 10 to 200 seconds) resend the gratuitous ARP in order to claim the IP-address(es) configured for this SCTP bound interfaces. On the other hand when a server (e.g., MME 130-B) in the SCTP-cluster is assigned a standby role it suppresses the ARP packets on all SCTP bound interfaces. In this way a Standby Server 130-B could assign the same IP-address(es) to its SCTP bound interfaces as the Active Servers 130-N without influencing the network traffic.

Figure 2C:
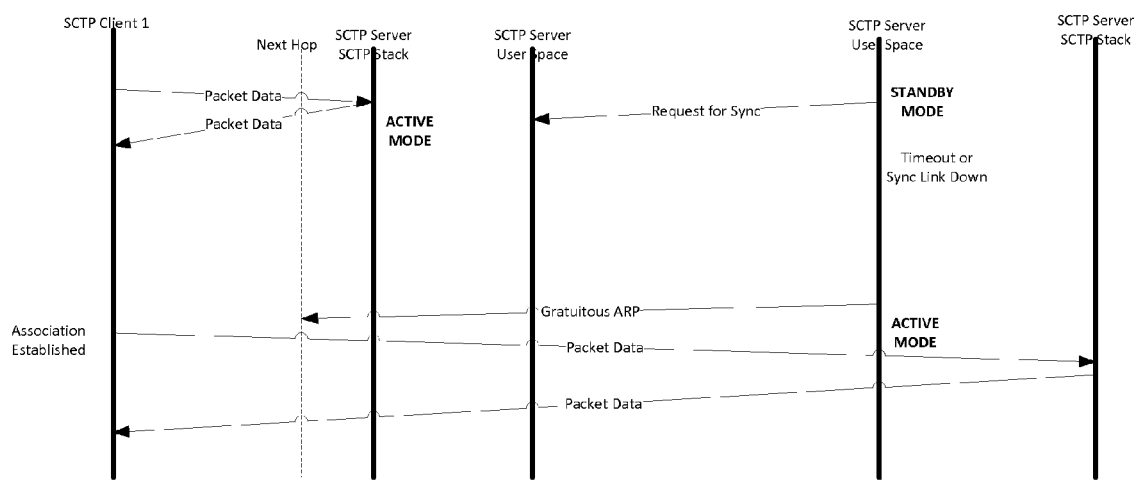
FIG. 2C is data flow diagram illustrating the procedure of SCTP-handover from the Active to the Standby Server.

There are at least two types of failure covered by these embodiments. Active Server HAE fails or complete node failure. FIG. 2C is data flow diagram illustrating the procedure of SCTP-handover from the Active Servers 130-N to the Standby Server 130-B in case of either type of failure. In case of full system failure on the Active Servers 130-N the TCP-connection will not close. The TCP-timers are very generous and as such not appropriate for detecting failure. In this case the Heartbeat timer timeout will be used as the detection mechanism for the failure of Active Servers 130-N by the Standby Server 130-B. It should be approximately 3 seconds or less (and preferably less than 1 second). So when the Active Server HAE fails, the TCP-connection will be closed immediately by the operating system of MME 130-B which will result in the Standby Server 130-B stepping instantaneously into the role of Active Servers 130-N. The Standby Server 130-B will proceed with gratuitous ARP's of the Active Server functionality. As a result all existing SCTP-traffic will be rerouted to the Standby Server 130-B.

More specifically, at the point of failure of the Active Servers 130-N the Standby Server 130-B will broadcast gratuitous ARPs on all SCTP bound interfaces. The effect of these ARPs will be that the SCTP IP address(es) will be mapped to the Standby Server's SCTP interfaces and all SCTP packets will begin to flow toward the Standby Server 130-B. Because the Standby Server's SCTP stack was fully synchronized it will be able to continue SCTP communications from the last sequence counters and this way it joins the group MME 130-N. A new Standby Server 130-B could be assigned at any time. The HAE playlist will be forwarded to the new Standby Server 130-B so that it could be used for subsequent failures. Thus it can be seen that the SCTP cluster (i.e., MMEs 130) will never need to drop an SCTP connection even after a sequence of failures in the active nodes as long as a standby node was available when the failure occurred.

The present embodiments describe a system and method to maintain the same association across multiple servers— which also means that the SCTP-client may use the same IP-address and port as well as maintain transmit and receive sequence numbers.

Figure 3:
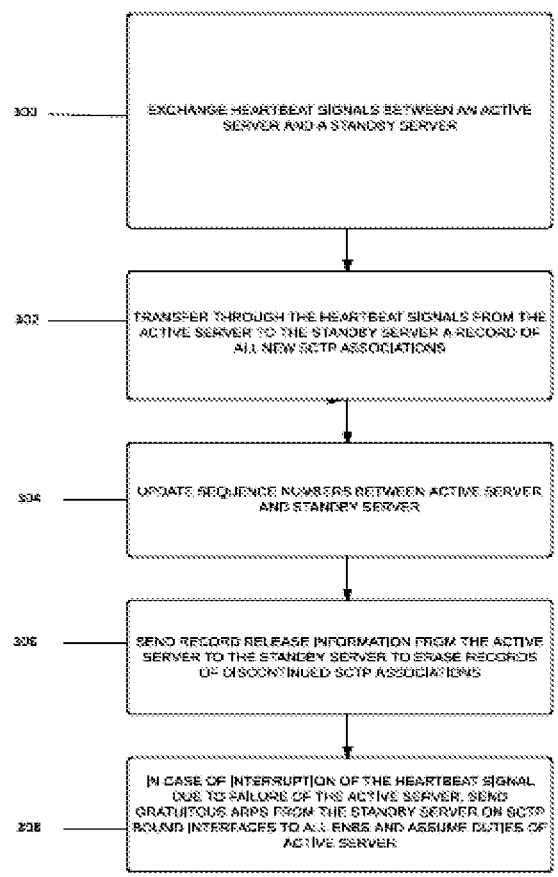
FIG. 3 is a flow chart of an exemplary process for performing a fail over operation according to the implementations described herein.

FIG. 3 is a high level flow chart of an example process for performing a fail over operation according to implementations described herein. In step 300, Heartbeat signals are exchanged between the Active Servers 130-N and the Standby Server 130-B. In step 302, new SCTP associations are copied to the Standby Server 130-B from the Active Servers 130-N. In step 304, the sequence numbers of the packets are updated from the Active Servers 130-N to the Standby Server 130-B. In step 306, SCTP associations that ended between the Active Server 130-1 and eNB group 120 are copied to the Standby Server 130-B. In case of a failure of the Active Servers 130-N, the Standby Server 130-B detects through the failure of the Heartbeat signals that it should take over the functions of the Active Servers 130-N and the gratuitous APRs are sent from the Standby Server 130-B to all eNB group 120.

Figure 1B:
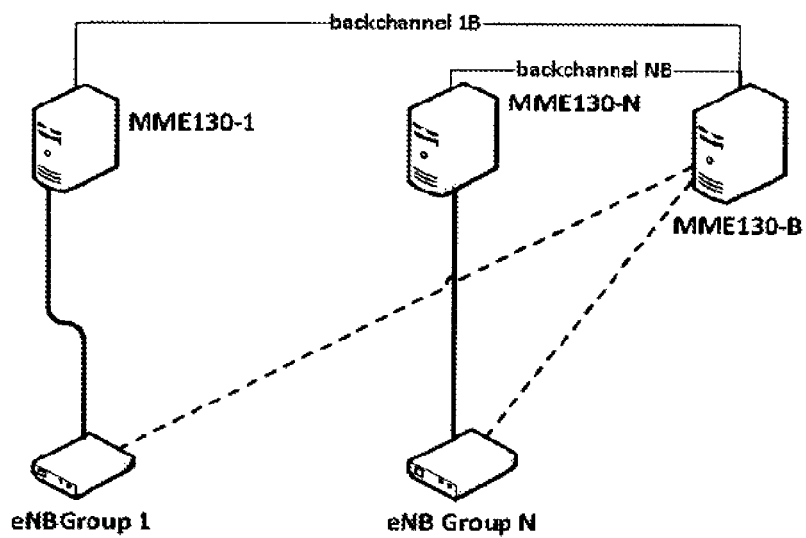
FIG. 1B is a schematic drawing illustrating a core network implementation in which the Standby Server supports a plurality of N Active Servers.

FIG. 1B is a schematic drawing illustrating an alternative core network implementation in which the Standby Server supports a group of other N Active Servers. The Standby (or Hot Back Up) Server MME 130-B is connected to Active Servers MME 130-1 associated with eNB Group 1 till MME 130-N associated with eNB Group N. Through backchannel connections (1B, NB) MME 130-B receives backchannel heartbeats (BHB), COS events (e.g., new SCTP association contexts, released SCTP associations) and SCTP associations sequence numbers from all active servers (as previously discussed above). MME 130-B creates all SCTP-associations from all Active Servers. If in one or more Active Servers either HAE fails and/or the complete node fails, MME 130-B will assume all or some of the packet communication functionality of the failed Active Server(s) providing seamless continuation of service.

Hot Backup Activation Staging of the system of FIG. 1B includes the following. Once MME 130-B HAE detects failure either because one or more TCP connections were interrupted or it didn't receive BHB in the allotted time delay, it will start Activation Procedure. The Activation happens in the following stages:
1. Assume the IP-addresses from the failed Servers in sending Broadcast Gratuitous ARPs over all SCTP bound interfaces;
2. Activate the SCTP Heartbeat Timers;
3. Synchronize the incoming data packets sequence numbers to the expected sequence numbers to prevent SCTP corruption;
4. If it receives retransmission notification form any SCTP client adjust the outgoing packet sequence number; and
5. Enter Activation Complete Stage.

Figure 4:
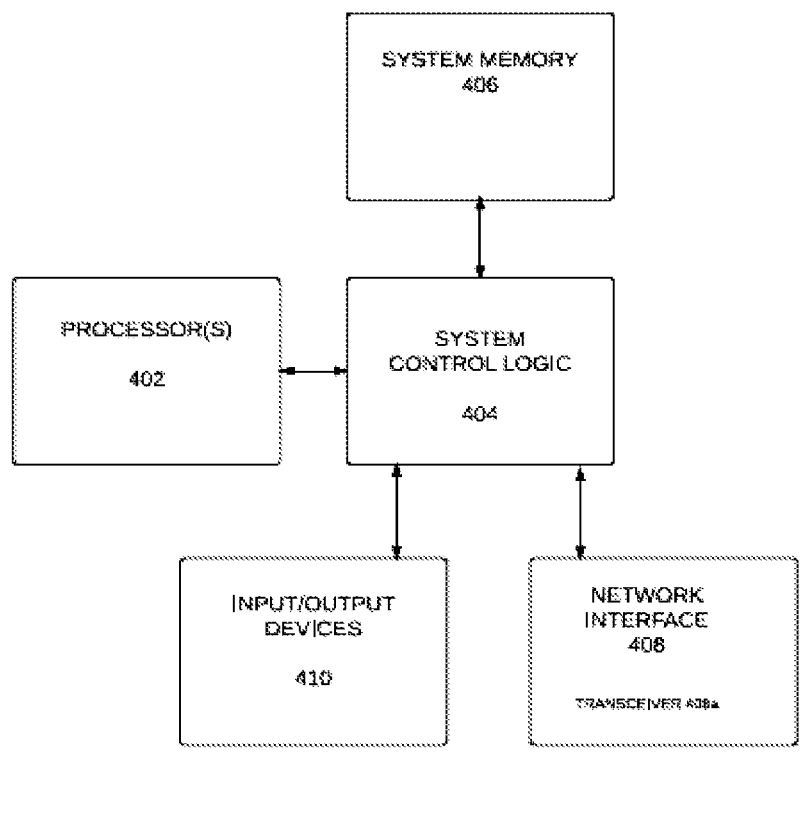
FIG. 4 is a block diagram of an exemplary core network element of an MME of FIGS. 1A and 1B.

The MMEs 130 discussed above are network elements in a packet network as illustrated by FIGS. 1A and 1B. Each network element 130 should include the elements in a hardware platform 400 as illustrated in FIG. 4 (and previously described above). Preferably the network elements are located in the core network or the functions as described herein may be divided among a plurality of network elements inside or outside the core network. However, in other embodiments the network element is not located physically at the core network but is logically located between the core network and the eNBs. The network element 130 hardware platform 400 may have a controller, logic, memory, interface, and input/output which may be implemented using any suitable hardware, software and/or firmware configured as shown in FIG. 4. FIG. 4 comprises one or more system control logic 404 coupled with at least one or all of the processor(s) 402, system memory 406, a network interface 408 (including a transceiver 408a), and input/output (I/O) devices 410. The processor(s) 402 may include one or more single-core or multi-core processors. The processor(s) 402 may include any combination of general-purpose processors and dedicated processors (e.g., graphics processors, application processors, baseband processors, etc.). System control logic 404 may include any appropriate interface controllers to provide for any suitable interface to at least one of the processor(s) 402 and/or to any suitable device or component in the packet core network in communication with system control logic 404. System control logic 404 may include one or more memory controller(s) to provide an interface to system memory 406. System memory 406 may be used to load and store data and/or instructions such as the knowledge database and logger function discussed above. System memory 406 may include any suitable volatile memory, such as suitable dynamic random access memory (DRAM), for example. System memory 406 may also include non-volatile memory including one or more tangible, non-transitory computer-readable media used to store data and/or instructions, for example, such as the embodiments described herein. The non-volatile memory may include flash memory, for example, and/or may include any suitable non-volatile storage device(s), such as one or more hard disk drive(s) (HDD(s)), one or more compact disk (CD) drive(s), and/or one or more digital versatile disk (DVD) drive(s). The memory 406 may include a storage resource physically part of a device. For example, the memory 404 may be accessed over a network via the network interface 408 and/or over Input/Output (I/O) devices 410. The transceiver in network interface 408 may provide a radio interface to communicate over one or more network(s) and/or with any other suitable device. Network interface 408 may include any suitable hardware and/or firmware. The network interface 408 may further include a plurality of antennas to provide a multiple input, multiple output radio interface.

Network interface 408 may include, for example, a wired network adapter, a wireless network adapter, a telephone modem, and/or a wireless modem. Network interface 408 enables data communication over a network such as network 160 (FIG. 1A). Network interface 408 may facilitate communication using a network protocol, such as TCP/IP. For one embodiment, at least one of the processor(s) 402 may be packaged together with logic for one or more controller(s) of system control logic 404. At least one of the processor(s) 402 may be integrated on the same die with logic for one or more controller(s) of system control logic 404. In various embodiments, the I/O devices 410 may include user interfaces designed to enable user interaction with peripheral component interfaces designed to enable peripheral component interaction and/or sensors designed to determine environmental conditions and/or location information related to the network element or system. In various embodiments, the peripheral component interfaces may include, but are not limited to, a non-volatile memory port, a universal serial bus (USB) port, an audio jack, and a power supply interface.

Figure 5:
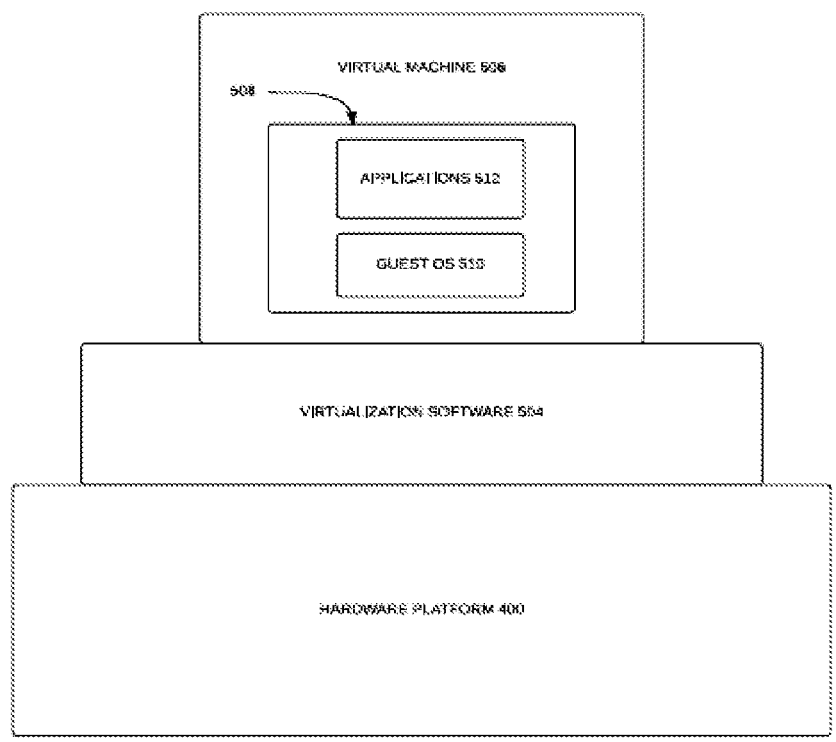
FIG. 5 shows a block diagram of an exemplary core network element of an MME of FIGS. 1A and 1B implemented on a virtualized computing system.

FIG. 5 shows a block diagram of an exemplary core network element of an MME 130 of FIGS. 1A and 1B implemented on a virtualized computing system. In alternative embodiments, MMEs 130 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization allows multiple virtual computing machines to run on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system 500 includes physical hardware platform 400, virtualization software 504 running on hardware platform 400, and one or more virtual machines 506 running on hardware platform 400 by way of virtualization software 504. Virtualization software 504 is therefore logically interposed between the physical hardware of hardware platform 502 and guest system software 508 running "in" virtual machine 506. Hardware platform 400 may be a computing system as discussed above. Memory 406 of hardware platform 400 may store virtualization software 504 and guest system software 508 running in virtual machine 506. Virtualization software 504 performs system resource management and virtual machine emulation. Virtual machine emulation may be performed by a virtual machine monitor (VMM) component. In typical implementations, each virtual machine 506 (only one shown) has a corresponding VMM instance. Depending on implementation, virtualization software 504 may be unhosted or hosted. Unhosted virtualization software generally relies on a specialized virtualization kernel for managing system resources, whereas hosted virtualization software relies on a commodity operating system—the "host operating system"—such as Windows or Linux to manage system resources. In a hosted virtualization system, the host operating system may be considered as part of virtualization software 504.

The High Availability Engine (HAE) described herein includes a Userspace Part (UP) and Kernel Part (KP). The HAE-UP is responsible for:
  maintaining the backchannel connection;
  sending/receiving BHB;
  adding/removing SCTP-context records;
  forwarding SCTP records to the KP;
  forwarding sequence numbers to the KP;
  request SCTP association contexts from the KP; and
  request SCTP associations sequence numbers from the KP.
The HAE-KP is responsible for:
  providing SCTP association contexts to the UP;
  providing SCTP associations sequence numbers to the UP;
  creating SCTP associations using SCTP association contexts provided by the UP; and
  updating the SCTP associations sequence numbers.
In case of any active MME 130-1 to N failure silently releasing SCTP associations (i.e., where silently means without notifying the SCTP-clients), the MME 130-B could provide seamless non-interrupted service.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

In this disclosure, devices or networked elements that are described as in "communication" with each other or "coupled" to each other need not be in continuous communication with each other or in direct physical contact, unless expressly specified otherwise.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:
1. A first network element for facilitating communication of packets comprising:
  a network interface unit configured to interact with a packet network system; and
  a processor with a memory associated with the network interface unit and configured to:
    perform Stream Control Transmission Protocol (SCTP) communications;
    send to and receive from a group of other network elements connected to the first network element a plurality of backchannel heartbeat signals, each network element in the group of other network elements performing SCTP communications;

detect interruption of at least one of the plurality of backchannel heartbeat signals from at least one or more interrupted network elements from the group of other network elements;

assume at least some of the SCTP communication responsibilities of the interrupted network elements from the group of other network elements; and after detection of the interruption, broadcast a plurality of gratuitous Address Resolution Protocols (ARPs) with Internet Protocol (IP) addresses of the interrupted network elements on SCTP bound interfaces.

2. The network element of claim 1, the processor with a memory further configured to:

before detection of the interruption, not respond to any Address Resolution Protocol (ARP) requests received on SCTP bound interfaces.

3. The network element of claim 1, the processor with a memory further configured to:

before detection of the interruption, create records of SCTP association contexts between the group of other network elements and a plurality of SCTP clients, receive through a plurality of backchannel heartbeat signals the records of the SCTP associations from network elements in the group of other network elements and store the records;

create SCTP associations between the network element and the plurality of SCTP clients at an SCTP stack by using the SCTP association contexts from the records;

set a state of the SCTP associations to active; and suppress sending SCTP Heartbeat requests by disabling a SCTP Heartbeat timer.

4. The network element of claim 3, the processor with a memory further configured in the SCTP stack to create a standard network sockets for the SCTP associations.

5. The network element of claim 3, the processor with a memory further configured to:

receive through the backchannel heartbeat signals updated SCTP sequence numbers and update all the SCTP associations with the updated SCTP sequence numbers.

6. The network element of claim 1, the processor with a memory further configured to:

before detection of the interruption, remove records of SCTP association contexts between the other group of network elements and a plurality of SCTP clients;

receive through a plurality of backchannel heartbeat signals an index of records of the SCTP associations to be removed;

delete the records of the SCTP associations to be removed; and release the SCTP associations between the network element and the SCTP clients at an SCTP stack.

7. The network element of claim 1, wherein the first network element is operating in a virtualized environment.

8. A first Mobility Management Entity (MME) server for facilitating communication of packets using a Stream Control Transmission Protocol (SCTP) comprising:

a network interface unit configured to interact with a packet network system;

a processor with a memory associated with the network interface unit and configured to:

perform SCTP communications;

send to and receive from at least one of a group of second MME servers connected to the first MME server a plurality of backchannel heartbeat signals;

detect interruption of at least one of the plurality of backchannel heartbeat signals from an interrupted second MME server from the group of second MME servers;

after detection of the interruption, broadcast a plurality of gratuitous Address Resolution Protocols (ARPs) with Internet Protocol (IP) addresses of the interrupted second MME server on SCTP bound interfaces;

assume at least some of the SCTP communication responsibilities of the second MME server.

9. The first MME server of claim 8, the processor with a memory further configured to:

before detection of the interruption, receive through a plurality of backchannel heartbeat signals records of SCTP association contexts between the at least one of the group of second MME servers and a plurality of SCTP clients from a second MME server in the group of other second MME servers and store the records; and create the SCTP associations between the first MME server and the SCTP clients at an SCTP stack by using the SCTP association contexts from the records.

10. The first MME server of claim 9, the processor with a memory further configured to:

before detection of the interruption, receive through the backchannel heartbeat signals updated SCTP sequence numbers and update all the SCTP associations with the updated SCTP sequence numbers.

11. The first MME server of claim 10, wherein the first MME server is operating in a virtualized environment.

12. A method for facilitating communication of packets at a first network element comprising:

perform Stream Control Transmission Protocol (SCTP) communications;

send to and receive from a group of other network elements connected to the first network element a plurality of backchannel heartbeat signals, each network element in the group of other network elements performing SCTP communications;

detect interruption of at least one of the plurality of backchannel heartbeat signals from at least one or more interrupted network elements from the group of other network elements;

assume at least some of the SCTP communication responsibilities of the interrupted network elements from the group of other network elements; and after detection of the interruption, broadcast a plurality of gratuitous Address Resolution Protocols (ARPs) with Internet Protocol (IP) addresses of the interrupted network elements on Stream Control Transmission Control (SCTP) bound interfaces.

13. The method of claim 12, further comprising:

before detection of the interruption, not respond to any Address Resolution Protocol (ARP) requests received on Stream Control Transmission Control (SCTP) bound interfaces.

14. The method of claim 12, further comprising:

before detection of the interruption, create records of Stream Control Transmission Control (SCTP) association contexts between the group of other network elements and a plurality of SCTP clients, receive through a plurality of backchannel heartbeat signals the records of the SCTP associations and store the records from network elements in the group of other network elements;

create SCTP associations between the network element and the SCTP clients at an SCTP stack by using the SCTP association contexts from the records;
set a state of the SCTP associations to active; and
suppress sending SCTP Heartbeat requests by disabling a SCTP Heartbeat timer.

15. The method of claim 14, further comprising:
create a standard network sockets for the SCTP associations in the SCTP stack.

16. The method of claim 14, further comprising:
receive through the backchannel heartbeat signal updated SCTP sequence numbers and update all the SCTP associations with the updated SCTP sequence numbers.

17. The method of claim 12, further comprising:
before detection of the interruption, remove records of SCTP association contexts between the other group of network elements and a plurality of SCTP clients;
receive through a plurality of backchannel heartbeat signals an index of records of the SCTP associations to be removed;
delete the records of the SCTP associations to be removed; and
release the SCTP associations between the network element and the SCTP clients at an SCTP stack.

18. The method of claim 12, wherein the first network element is operating in a virtualized environment.

\* \* \* \* \*